United States Patent [19]

Yonezawa et al.

[11] Patent Number: 5,302,967
[45] Date of Patent: Apr. 12, 1994

[54] FIGURE PROCESSING APPARATUS AND METHOD AIDED BY DISPLAY WITH RULED LINES

[75] Inventors: Kay Yonezawa, Machida; Kunihiro Yanagi, Sagamihara, both of Japan

[73] Assignee: Hitachi, Ltd., Tokyo, Japan

[21] Appl. No.: 795,663

[22] Filed: Nov. 21, 1991

[30] Foreign Application Priority Data

Nov. 26, 1990 [JP] Japan .................................. 2-317790

[51] Int. Cl.$^5$ .............................................. G09G 1/06
[52] U.S. Cl. .................... 345/131; 345/125; 345/113; 345/145; 395/139
[58] Field of Search ............... 340/723, 747, 731, 709, 340/727, 706, 711, 712, 734, 722; 395/133, 139, 140, 141, 142, 143

[56] References Cited

U.S. PATENT DOCUMENTS

| | | | |
|---|---|---|---|
| 4,267,573 | 5/1981 | Chaikin et al. | 340/727 |
| 4,532,605 | 7/1985 | Waller | 340/731 |
| 4,686,522 | 8/1987 | Hernandez et al. | 340/723 |
| 4,701,752 | 10/1987 | Wang | 340/723 |
| 4,745,405 | 5/1988 | Himelstein et al. | 340/727 |
| 4,746,916 | 5/1988 | Sanbe | 340/731 |
| 4,813,013 | 3/1989 | Dunn | 340/747 |
| 5,019,809 | 5/1991 | Chen | 340/727 |

OTHER PUBLICATIONS

Hitachi User Manual for "2050 OFIS/SKETCH2-EV", (Provided in Japanese) pp. 26, and 75-79.
Macintosh User Manual for "Superpaint", Chapter 12, pp. 4-180-4-185. (Provided in English).

Primary Examiner—Alvin E. Oberley
Assistant Examiner—Xiao M. Wu
Attorney, Agent, or Firm—Fay, Sharpe, Beall, Fagan, Minnich & McKee

[57] ABSTRACT

A figure processing method and a figure processing apparatus having a function to automatically display suitable ruling lines for drafting and editing a figure by utilizing a display screen are disclosed. The method and the apparatus determine sort of displaying ruled lines such as lattice, circle and rectangle in relation to shape of a subjected figure and also a figure constructing procedure, and determine coordinates of an adequate datum point of the ruled lines on the display screen depending upon the shape of the subjected figure, then display configuration of the ruling lines on the display screen relying on coordinates of the datum point. The method and apparatus acquire coordinates of a point designated by an operator and modify the coordinates of the designated point relying on the ruling lines, then perform the figure constructing procedure on the figure relying of the modified coordinates of the designated point.

7 Claims, 10 Drawing Sheets

FIGURE PROCESSING APPARATUS AND METHOD AIDED BY DISPLAY WITH RULED LINES

FIELD OF THE INVENTION

The present invention generally relates to a figure processing method and a figure processing apparatus. More specifically, the present invention is directed to a figure processing method and a figure processing apparatus having a function for automatically displaying ruling lines suitable for drafting and editing a figure by utilizing a display apparatus by an operator.

BACKGROUND OF THE INVENTION

In general, there have been known such a figure processing apparatus and a method that a figure is drafted and edited in response to an instruction issued from an operator with operating a mouse or the like, while observing the figure displayed on a display. When the figure is formed by way of the above-explained apparatus and method, figure processings such as a parallel displacement, a rotation, a mirror-image inversion, a duplication, an erasing and a zooming operation must be carried out with respect to the figure displayed on the display. These figure processings may require to move the figure shown in the display to a desirable position, to designate a side or a radius of the figure, and to modify it to a desirable length. However, it is difficult that the operator visually and correctly measures a distance and a position on a display screen. It is also difficult to make a pointing device such as a mouse coincident with a desirable pixel, because the operator may move his hand. As described above, it is so difficult for the operator to correctly designate a point, a position and a length on a screen of a display.

Therefore, most of the drafting or figure processing apparatuses aided by display devices own a function to display square latticed rules on the screens and also to correct the position pointed out by the pointer on the display screen to a cross point of the lattice or a point on the lattice line in order to aid the position designation for accepting such demands.

The operators who employ such a figure processing apparatus, can readily determine a correct position by designating an adjoining position of a target lattice point or lattice line, instead of pointing the exact point on the display.

Some of these figure processing apparatuses own a function capable of modifying an interval of the lattice lines, a gradient thereof, and a datum position by the operator.

However, since the conventional figure processing apparatuses can display only the square latticed rules, it is impossible to determine correct lengths when the lines cross each other not at a right angle. Also, since it is not easy to modify an attribute of the ruled lattice in the conventional figure processing apparatuses, it is difficult to locate a lattice point of the rules on the center of the circle for correctly modifying the center and radius of the circle based on the rules. Also, in case that the figure is desirable to be moved in a proper direction, it is difficult to make the gradient of the latticed rules coincident with the desirable direction for relying to move the figure on the rules.

For instance, if a designation is made of a point which is separated from a certain point by a predetermined distance, relying on the square latticed rules, this distance cannot be correctly determined unless two points are located on the same lattice line and the distance between these two points is equal to a value obtained by multiplying the interval of the lattice lines by a certain integer number. If a straight line is drawn no in parallel to the ruled lines, there are many cases that a length and a position can be hardly, correctly determined.

Also when a radius of a circle is designated, it is difficult to establish a correct designation unless the center of the circle is coincident with the latticed point.

As previously explained, the optimum shapes of the rules, optimum intervals thereof and optimum positions thereof should be determined based upon the sorts and target amounts of the processing operations to be executed, and there are some cases that the squared latticed rules impede the correct position designation.

It is so desirable that the display displays only such ruled lines as to be utilized when an operator performs an operation. For instance, if a distance is designated by using a lattice interval as a unit, a selectable point for the figure processing is included in the points on the lattice line which passes through the datum point used to measure the distance.

However, in accordance with the conventional figure processing apparatuses, since a large quantity of unnecessary points are displayed, there are higher probabilities that erroneous designation may happen to occur, because an operator moves his hand and causes visual errors.

Furthermore, there are some cases that no point is present t be designated by the operator in the latticed rules, when a radius cannot be designated unless a gradient of the latticed rules is modified because a lattice point indicative of the radius scales out from the display, or when a designation is made based on an angle.

Furthermore, there is only one sort of latticed rules which can be used at the same time. If the position, interval and angle of the latticed rules being displayed, are not suitable, the attributes of the rules must be changed. For example, in case that a plurality of ruled lines are alternately used, the attributes of the ruled lines must be changed every time. An operator must give up an operability of the conventional figure processing apparatus and a correct positional designation thereof, and thus he must continue to use the same ruled lines, or he endures such a cumbersome operation that the attributes are repeatedly changed.

Also, a ruled line is formed using a coordinate of at least one datum point as a reference point. For instance, latticed rules are formed so that coordinates of two datum points are used for opposite points of the unit lattice, whereas concentric ruled lines are formed and displayed in dot lines with a predetermined interval so that the center point is located at a coordinate of a datum point. To perform an enlarging process or a compressing process with respect to a figure drafted on a display screen with displaying an arbitrary ruled line thereon, there are some cases to easily draft a correct figure by substituting the presently displayed ruled lines by suitable ruled lines for an individual process.

For instance, when a circular figure is enlarged or reduced with fixing the center, it is preferable to use concentric ruled lines whose datum points are the center of the circular figure. However, it is difficult to designate the correct coordinate of this datum point with reference to the ordinary latticed rules and the displayed circular figure.

SUMMARY OF THE INVENTION

An object of the present invention is to provide a figure processing apparatus and a figure processing method capable of displaying ruled lines suitable for a figure processing operation to be executed, and also of easily designating a correct position.

A figure processing method, according to the present invention, for forming a figure with employment of a drafting machine having a display screen which displays both a figure to be drafted and ruled lines for aiding the drafting operation, comprises the steps of:

determining a sort of ruled lines to be displayed, in accordance with a shape of the subjected figure displayed on the display screen and a figure processing procedure instructed by an operator;

determining coordinates of datum point of the ruled lines on the display screen in accordance with the shape of the subjected figure;

displaying a configuration of said ruled lines, relying on the coordinates of datum point:

acquiring coordinates of a point designated by the operator;

modifying the coordinates of said designated point, relying on said ruled lines; and, performing said instructed figure processing procedure to said figure, relying on said modified coordinates of the designated point.

A figure processing apparatus, according to the present invention, comprises:

ruled line determining means for determining a sort of the ruled lines to be displayed, depending upon both a shape of the subjected figure displayed on the display screen and a figure processing procedure instructed by an operator;

ruled line displaying means for determining coordinates of datum point of the ruled lines on the display screen in accordance with the shape of the subjected figure to display a configuration of the ruled lines on the display screen, relying on the coordinates of the datum point; and, coordinate reading means for acquiring the coordinates of the point designated by the operator;

figure processing procedure means for modifying the coordinates of the designated point, relying on the ruled lines, and for performing the instructed figure processing procedure to the figure, relying on the modified coordinates of the designated point.

In accordance with the figure processing apparatus and method of the present invention, since the ruled lines optimal to the figure processing is automatically displayed on the display, the operator can very easily or correctly draft a figure based upon the displayed ruled lines.

DESCRIPTION OF THE PREFERRED EMBODIMENTS

Figure 9:
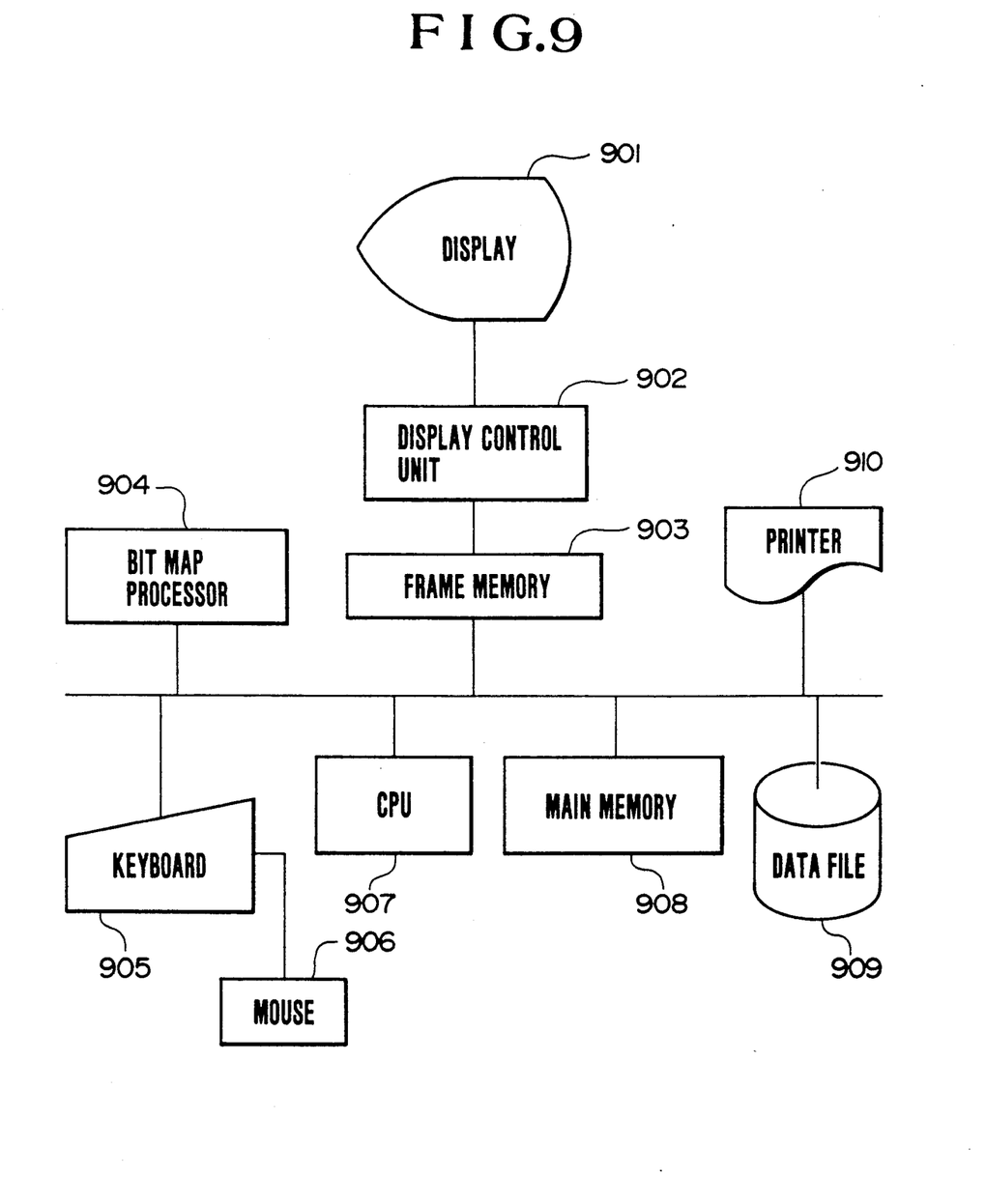
FIG. 9 is a schematic block diagram of a figure processing apparatus.

FIG. 9 is a schematic block diagram for showing a hardware arrangement of a figure processing system according to one preferred embodiment of the present invention.

In FIG. 9, reference numeral 901 designates a display unit for displaying a figure to be processed by the figure processing system, and a menu, and also information required for processing ruled lines, and so on. Reference numeral 902 designates a display control unit for controlling display of information on the display unit, 903 a frame memory for storing bit map data to memorize screen information corresponding to an overall display screen, and 904 a bit map processor for processing bit logic operation on data stored in the frame map. Reference numeral 905 designates a keyboard, and 906 a mouse used to enter a user's instruction. Although a pointing device such as a mouse is used in general for inputting information of position designation, a keyboard may be used for the same purpose. Reference numeral 907 designates a central processing unit (CPU) for processing a figure by utilizing programs and data stored in a main memory 908. The processed figure is stored in a data file 909, or is printed out from a printer 910. It should be noted that the present invention is not limited to the above-described constructive elements, but may employ other constituent elements. For instance, a tablet and other devices may be employed as the input units.

Figure 10:
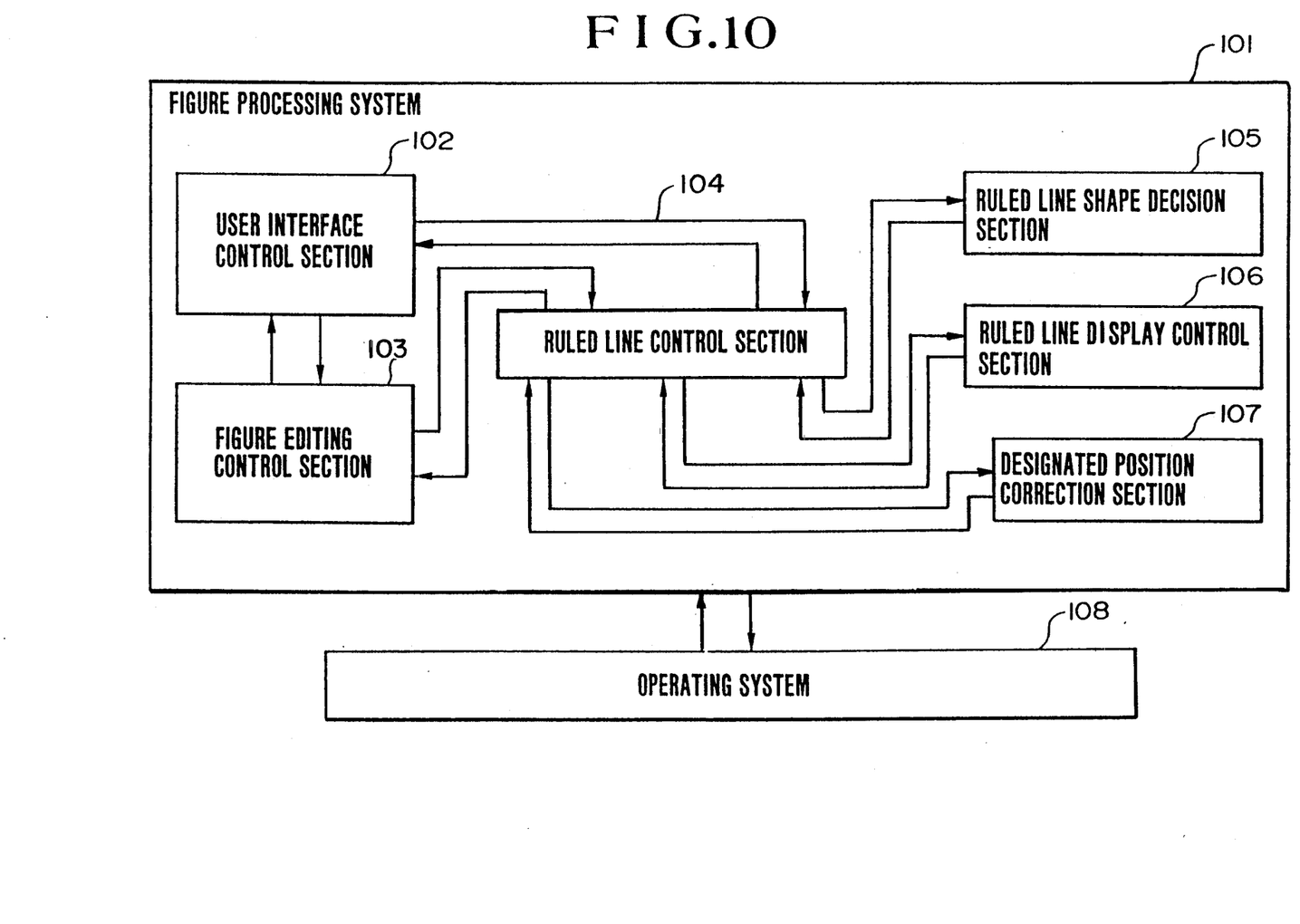
FIG. 10 is a schematic diagram showing configuration of a figure processing system according to the present invention.

FIG. 10 shows a functional arrangement of a figure processing program into which one preferred embodiment of the present invention has been assembled. In accordance with this preferred embodiment, draft and edit of a figure are performed in accordance with an operation of an operator based upon a figure processing system indicated by reference numeral 101.

Reference numeral 102 denotes a user interface control section for displaying a figure, an operation menu, and ruled lines and the like which are to be processed, on a screen, and also for interpreting an instruction issued from the operator. Reference numeral 103 denotes a figure editing control section for drafting and editing figures in accordance with the operation instruction of the operator which has been interpreted by the user interface control section. Reference numeral 104 designates a ruled-line control section which interrogates a ruled-line shape decision section 105 about the shape of ruled lines to be displayed when the ruled lines are required to be displayed, and cause the ruled lines to be displayed on a ruled-line display control section 106. Also, when information of position designation is inputted by the operator, the ruled-line control section 104 instructs a designated position correction section 107 to execute a correcting process, and transfers the corrected result to the figure editing control section 103.

Further, an operating system 108 controls to execute an application program containing the figure process system 101, and manages various hardware units comprised in the figure processing apparatus.

Figure 1:
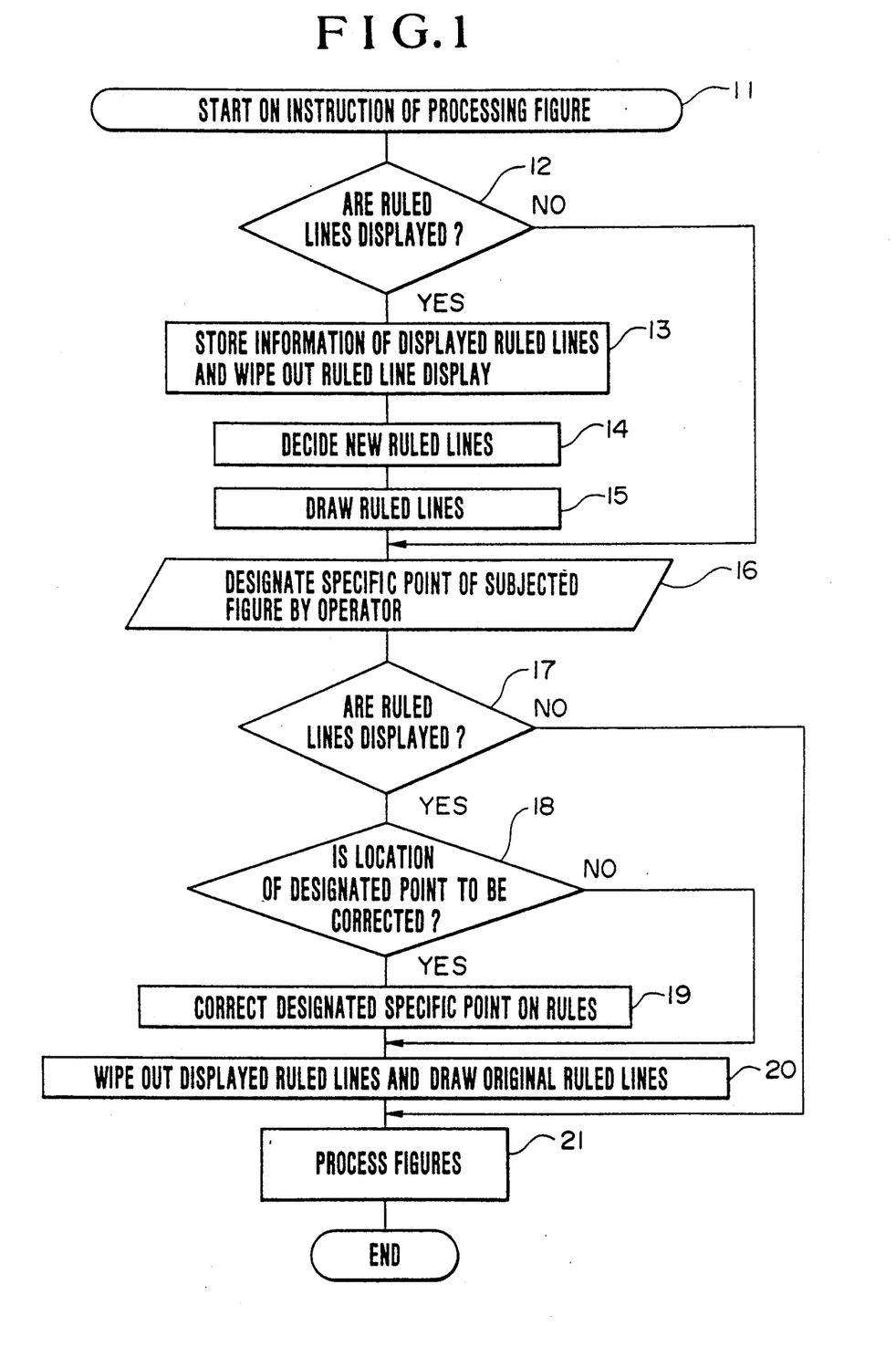
FIG. 1 is a flow chart showing a process sequence of a figure processing apparatus of the present invention.
Figure 2:
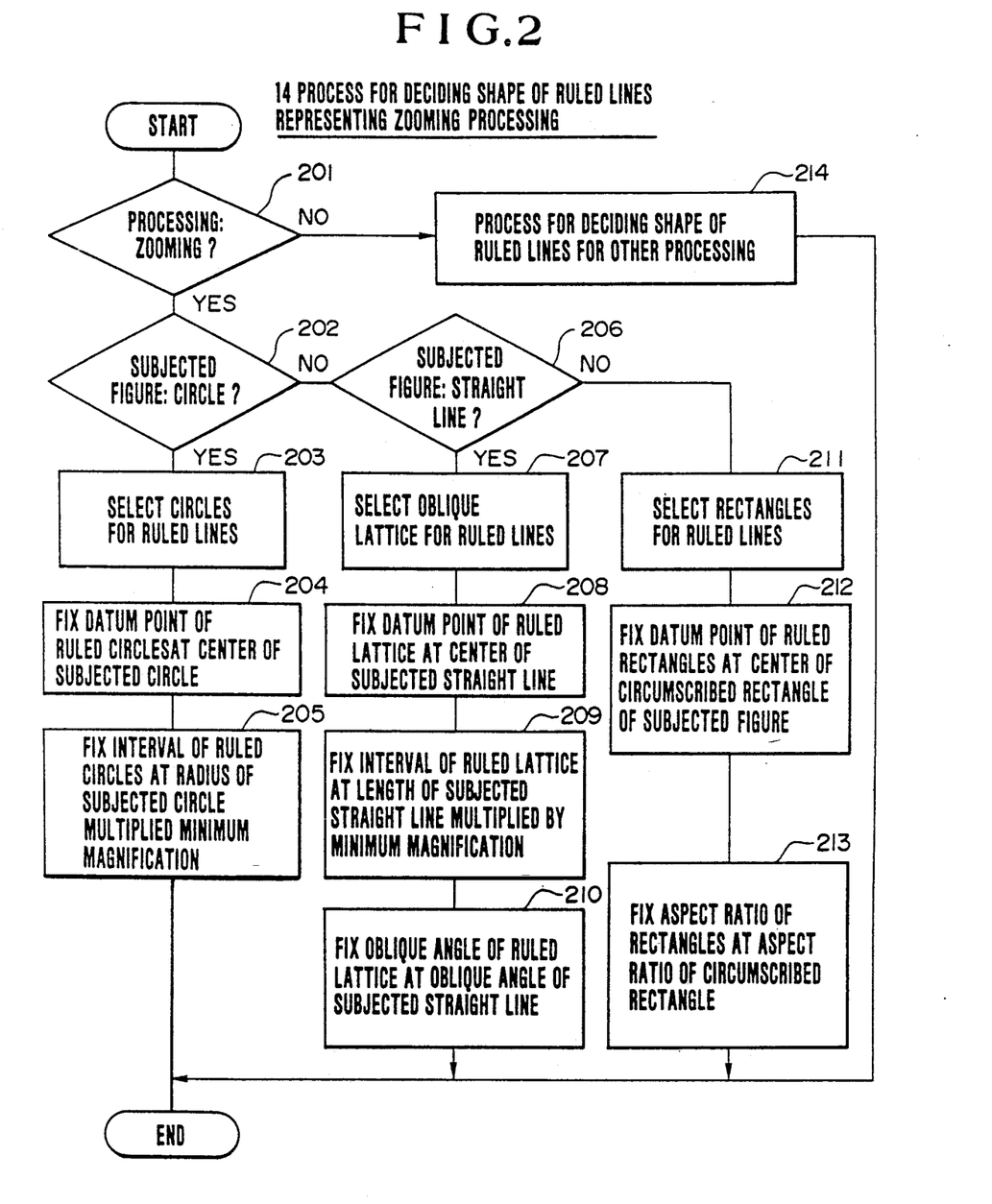
FIG. 2 is a flow chart showing a process sequence of determining a ruled line to be displayed.
Figure 4:
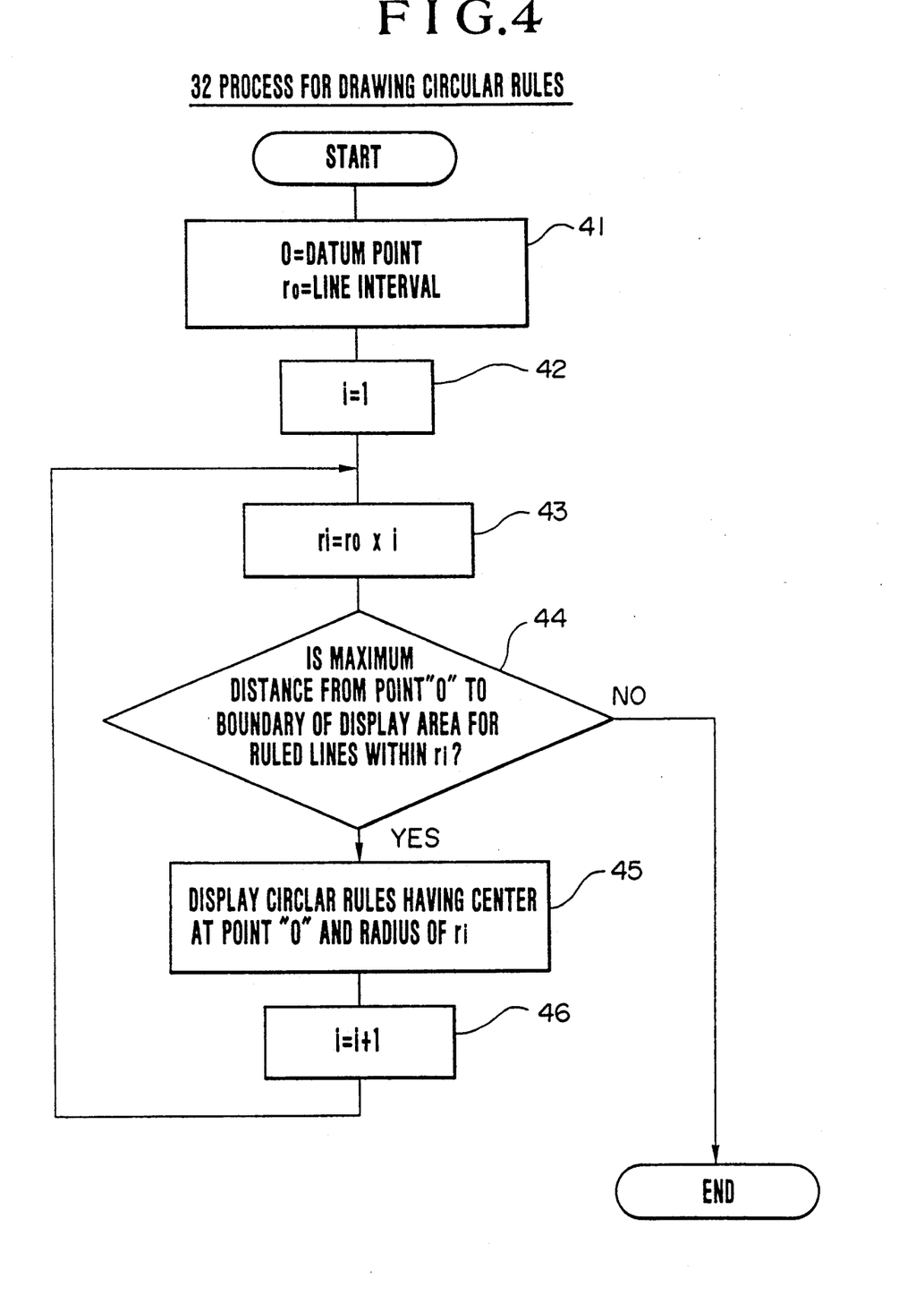
FIG. 4 is a flow chart showing a display process sequence of a circular ruled line.
Figure 5:
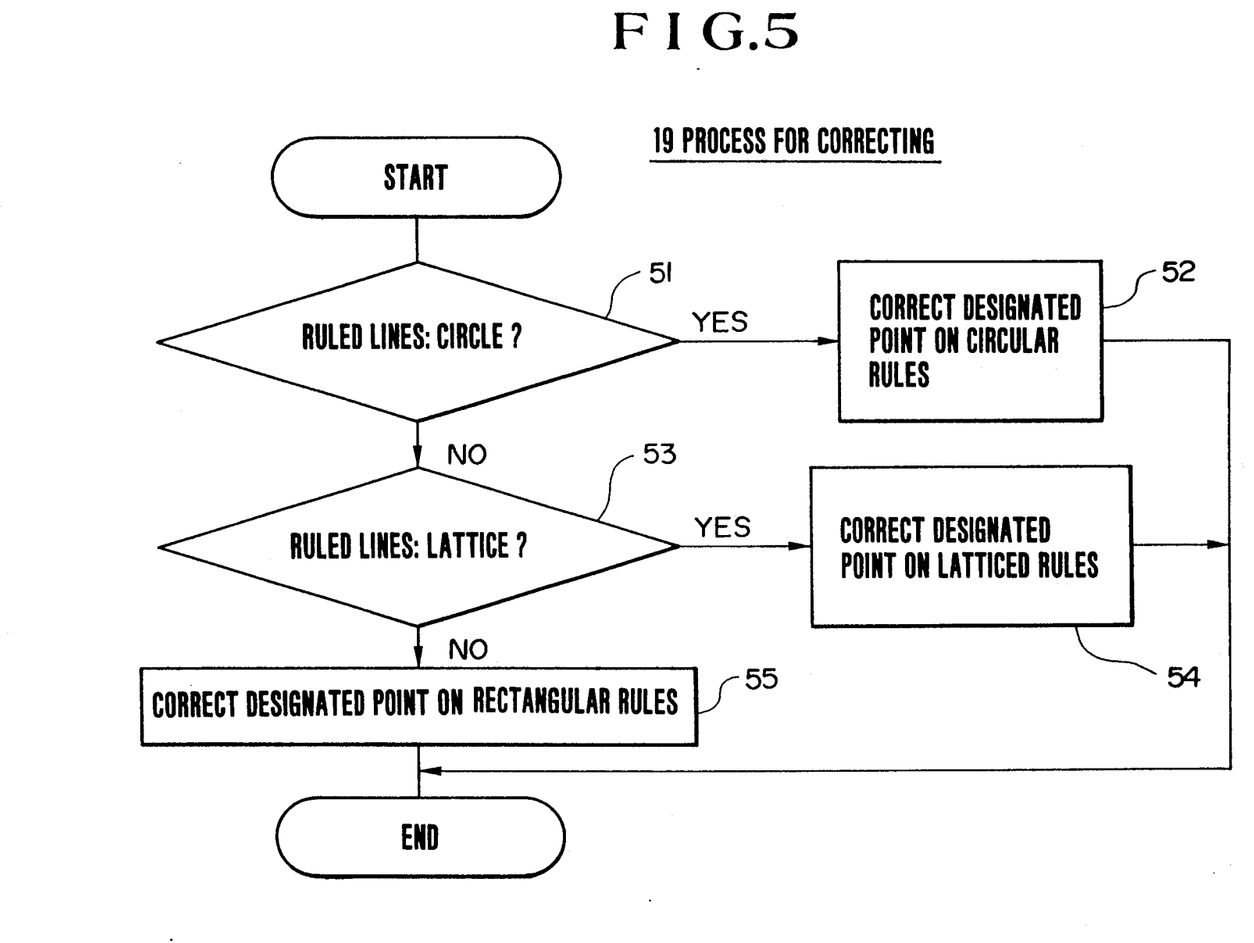
FIG. 5 is a flow chart illustrating a correcting process sequence of a circle.
Figure 6:
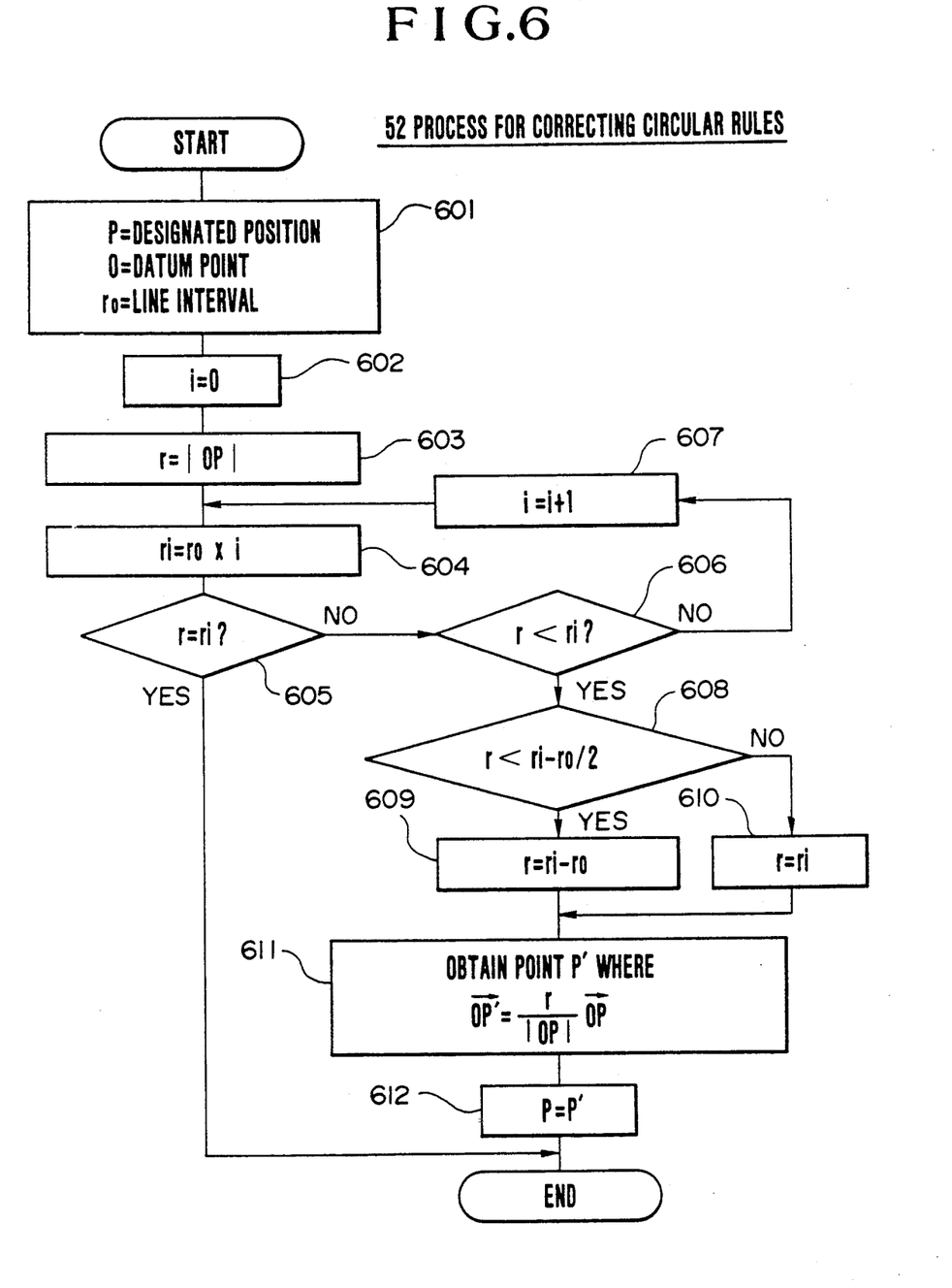
FIG. 6 is a flow chart indicating another correcting process sequence of a figure with employment of a circular ruled line.

FIG. 1 is a flow chart illustrating a process sequence or procedure, according to one preferred embodiment, in case that a figure processing operation such as a zooming operation of a figure is carried out by the figure processing apparatus of the present invention. FIG. 2 is a flow chart showing a process for determining a shape or form of ruled lines to be displayed, according to the embodiment. FIG. 4 is a flow chart illustrating a display process of circular ruled lines, according to the embodiment. FIG. 5 is a flow chart showing a process to correct a position designated by the operator on a ruled line, according to the embodiment. FIG. 6 is a flow chart illustrating a process to correct a position on a circular ruled line.

Figure 7A:
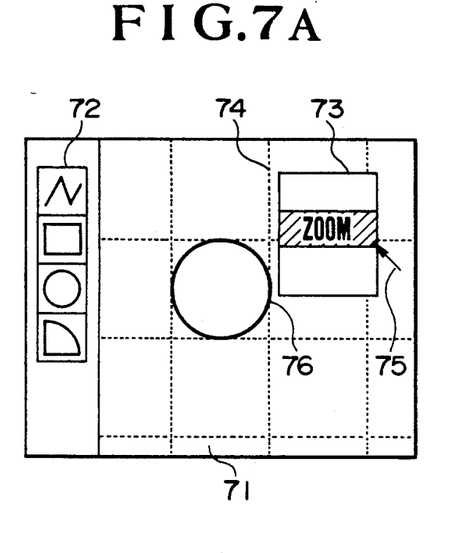
FIG. 7A is an illustration for a zooming operation on a circle with latticed rules displayed.
Figure 7B:
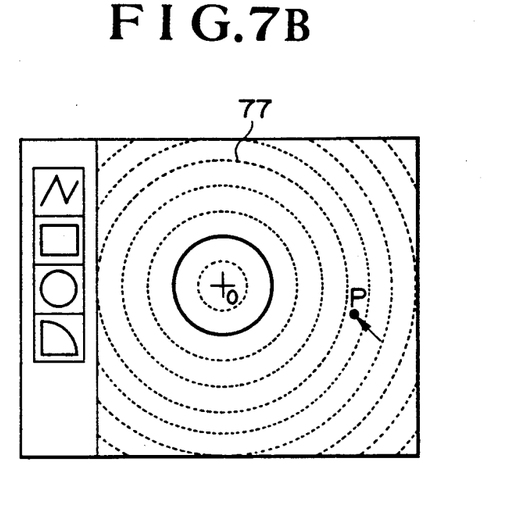
FIG. 7B is an illustration where the latticed rules are changed into circular ruled lines.
Figure 7C:
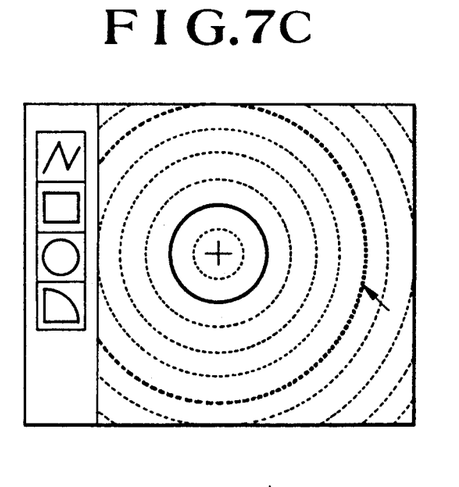
FIG. 7C is an illustration showing that an operator designates a size of zooming operation.
Figure 7D:
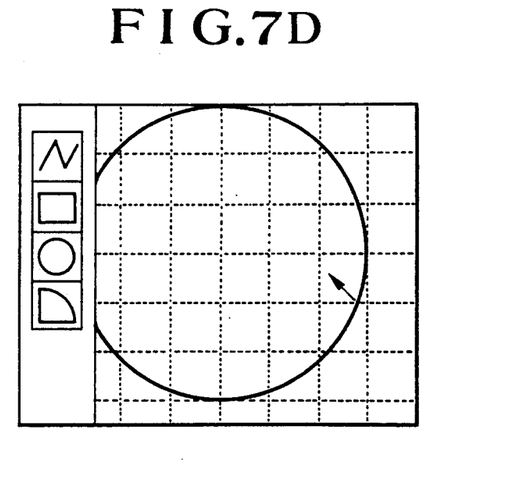
FIG. 7D is an illustration showing the zoomed circle.
Figure 8A:
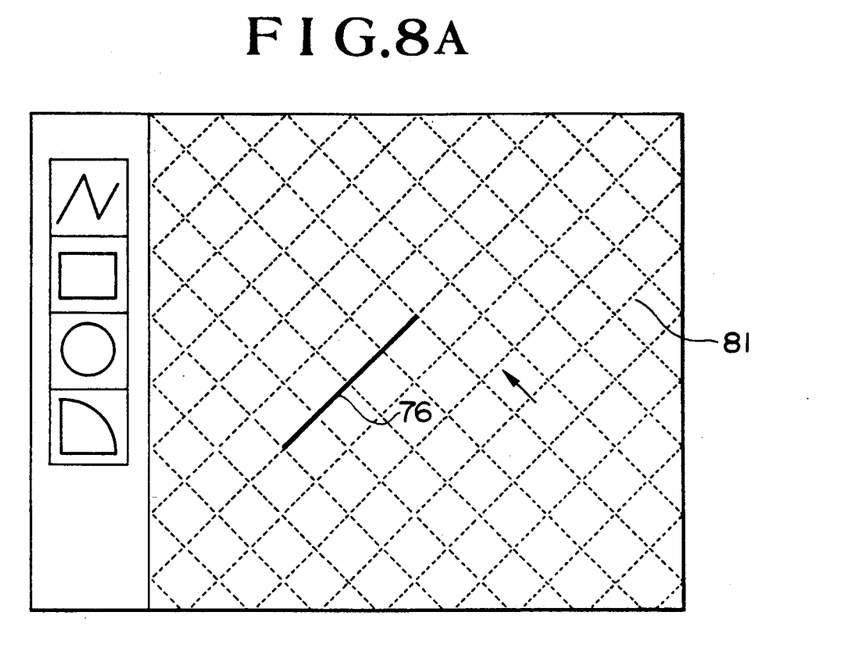
FIG. 8A is an illustration showing another display example of ruled lines.
Figure 8B:
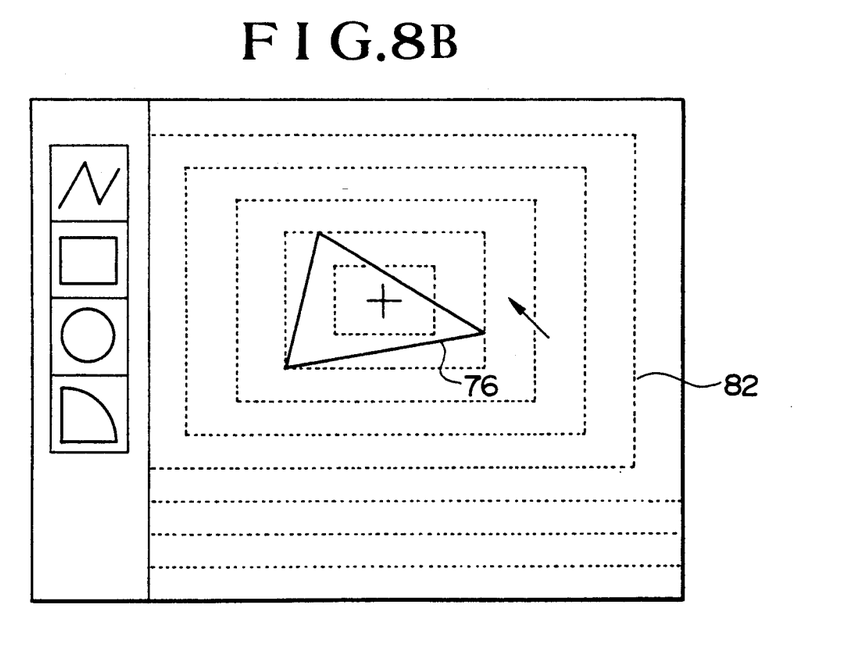
FIG. 8B is an illustration showing a further display example of ruled lines.

FIG. 7A illustrates such a state that a zooming operation is to be conducted on a circle while displaying latticed rules thereon. FIG. 7B indicates such a state that the latticed rule has been changed into circular ruled lines. FIG. 7C indicates such a state that the operator has designated a size of zooming operation on the circular ruled lines. FIG. 7D shows a display screen under such a state that the zooming process for the circle is accomplished and then the original latticed rules are displayed. FIG. 8A shows such a state that oblique latticed rules are displayed with respect to a straight line for a zooming process. FIG. 8B shows a display screen under such a state that rectangular ruled lines are displayed with respect to a polygon for a zooming process.

In FIGS. 7A to 7D, and FIGS. 8A and 8B, reference numeral 71 denotes a figure drafting region, 72 a draft menu, 73 a figure editing menu, 75 a cursor, 76 a figure to be edited, and reference numerals 74, 77, 81 and 82 denote ruled lines.

Referring now to the flow charts shown in FIGS. 1, 2, 3, 4, 5 and 6, a description will be made of such a process for performing a zooming process of figures, depending upon a sort of figures to be processed, with employment of ruled lines having shapes adapted to the figure's sort. Examples of screen representations for the process operations are shown in FIGS. 7A to 7D, and FIGS. 8A and 8B.

Assuming now in this preferred embodiment that the zooming operations for the figures are carried so that concentric circular ruled lines are selected for a circle to be zoomed, latticed ruled lines for a straight line, and rectangular ruled lines analogous to a circumscribing rectangle of the figure to be zooming-processed for other sort of figures than the above described figures.

It is also assumed that as shown in FIG. 7A, latticed rules 74 are dislayed at the initial state, and a zooming operation is carried out for a circle 76.

When the zooming operation is initiated by selecting the operation from the figure editing menus 73 with the cursor 75, which are displayed with icons (see FIG. 7A and step 11 of FIG. 1), a check is first made if ruled lines are displayed or not (step 12). When the operation is performed in a mode without displaying ruled lines, since it is not required to process ruled lines, the process is directly advanced to step 16. At step 12, in case that "ruled lines are displayed", a display of the ruled lines is wiped out after storing data about the ruled lines being presently displayed (step 13). Thereafter, another ruled lines for aiding in the zooming operation are displayed at steps 14 and 15.

First, shape of the ruled lines to be displayed are determined (step 14).

FIG. 2 shows a detailed flow about the deciding process 14 for determining shape of the ruled lines as to the zooming process. In the flow chart of FIG. 2, the sort of figure processing operation to be executed is determined (step 201 of FIG. 2). Since the zooming operation is executed in this example, the process is advanced to step 202 at which the sort of figure to be processed is checked. Since the sort of figure to be processed is a circle in this example, a sort of ruled line is selected to be a "circle" (step 203); the center of the subjected circle to be processed is assumed as a datum point of display for the ruled line (step 204); and then a value obtained by multiplying the radius of the subjected circle by a minimum magnification is assumed as an interval of the ruled lines (step 205).

If the sort of figure to be processed is a straight line (step 206), then a sort of ruled line is selected to be an "oblique lattice" (step 207); a starting point of the straight line is set to the datum point of display for the ruled line (step 208); a value obtained by multiplying a length of the subjected straight line by a minimum zooming magnification is selected to be an interval of the ruled lines (step 209); and then the gradient of the subjected straight line is selected to be the gradient of the oblique lattice (step 210).

When the sort of figure to be processed is neither a circle, nor a straight line, a sort of ruled lines is selected to be "rectangle" (step 211), a cross point of diagonal lines of the circumscribed rectangle for the subjected figure is set to a datum point of the ruled lines (step 212); and an aspect ratio of the circumscribed rectangle of the subjected figure is set to an aspect ratio of the rectangle to be displayed as the ruled lines (step 213). If other figure processing operation than the zooming process is selected, the process is branched to procedures suitable for the sort of the selected processing operation (step 214).

When the shape of the ruled lines is decided through the deciding process 14, the ruled lines are displayed (step 15 of FIG. 1).

Figure 3:
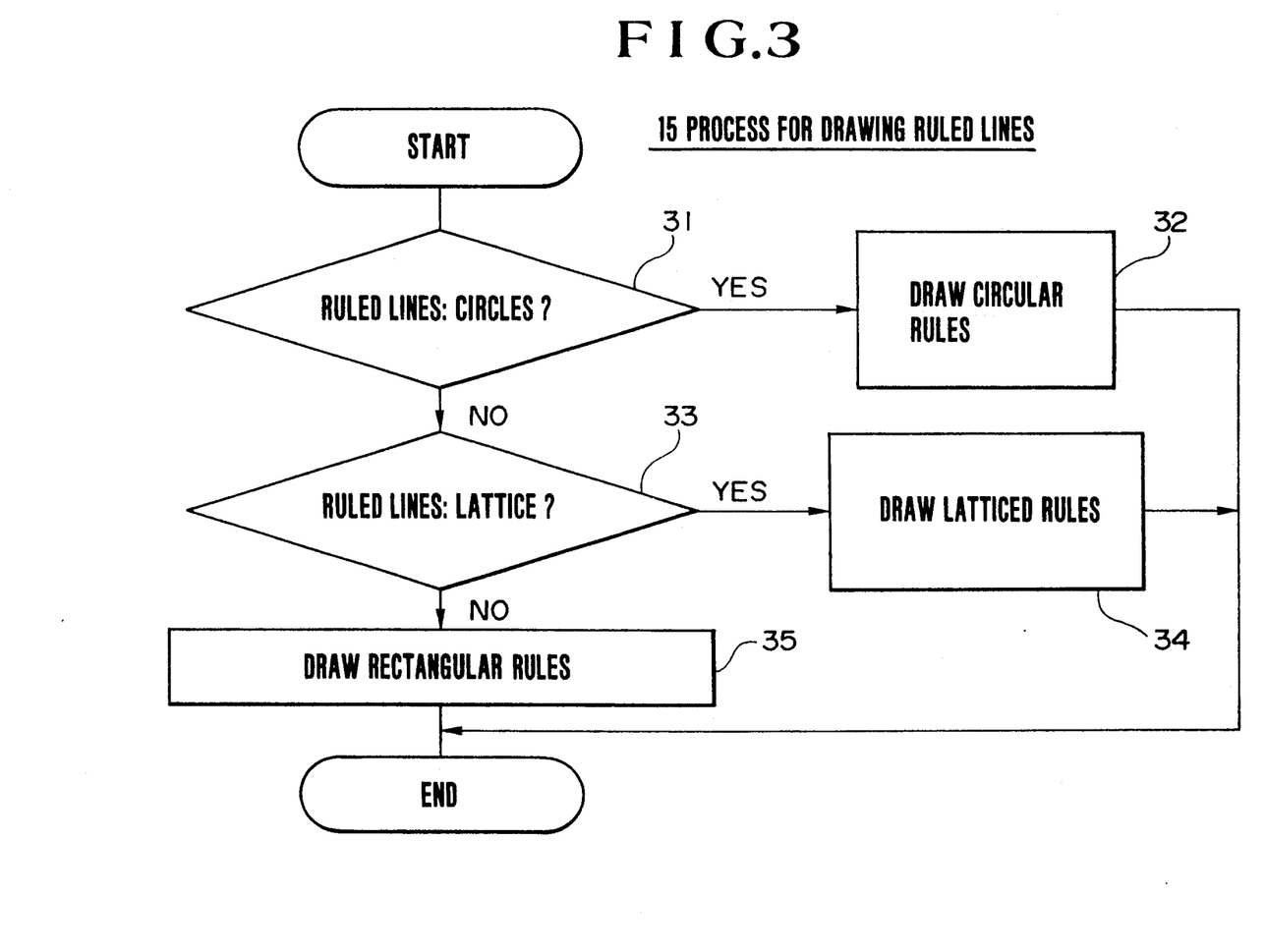
FIG. 3 is a flow chart indicating a display process sequence of a ruled line.

A detailed content of the ruled lines drawing process 15 is shown in FIG. 3. Since the sort of the ruled lines is circular (step 31 of FIG. 3), a process for drawing circular ruled lines on the display screen is called (step 32).

A detailed flow of the process for drawing the circular ruled lines is shown in FIG. 4, "O" is substituted by coordinates of the datum point of the ruled lines and $r_o$ by the interval of the ruled lines (step 41), and a counter i is set to 1 (step 42), then $r_i = r_o \times i$ is obtained in step 43. Those "$r_i$" become radii of the circular ruled lines. An investigation is carried out for a distance up to a boundary of a region for displaying the ruled lines from the point "O", namely a figure drawing region 71 in this case in order to check whether or not the circular ruled lines can be drawn within the display screen (step 44). If the maximum distance is smaller than, or equal to "$r_i$", the process is ended because the ruled lines cannot be displayed. If the distance is greater than "$r_i$", a circle having the center at the point "O" and the radius of "$r_i$" is displayed (step 45). The circle is clipped by the boundary of the display region (step 46). The process is returned to step 43, and then the process operations as defined from step 43 to step 46 are repeated until the ruled lines scales out of the display region.

In case that the sort of the ruled lines is a "lattice" (step 33), the process advances to a process for displaying latticed rules (step 34) and latticed rules 81 are displayed (see FIG. 8A). In case of other sorts, the process advances to a process for displaying rectangular rules (step 35) and rectangular rules 82 are displayed (see FIG. 8B).

Once ruled lines 77 are displayed (see FIG. 7B), the system waits for the operator to designate a size of the figure expected after the zooming process. When the user designates a point on the figure drawing region 71 (step 16 and FIG. 7C), it is checked if ruled lines are displayed (step 17). If it is judged that the ruled lines are displayed, a further check is performed with respect to a correction mode (step 18). If the checked correction mode if in "correction is required", a correction process on the designated point is carried out (step 19).

When the ruled lines are not displayed, or when the correction mode is in "correction is unnecessary", the zooming operation of the figure is carried out utilizing the coordinates of the designated point by the operator (step 21).

FIG. 5 is a flow chart for illustrating the correction process 19. First, a check is done whether or not a sort of ruled lines are circular (step 51). If YES, then a process for correcting the designated point on the circular ruled lines is executed (step 52). To the contrary, if NO, then a further check is made whether or not the sort of the ruled lines are lattice (step 53). If YES, then a process for latticed rules is performed (step 54). If NO, then a process for rectangular rules is performed (step 55).

Since the sort of the ruled lines is circular in this example (step 51), the process for circular rules is called (step 52).

A detailed content of the correcting process for circular rules (step 52) is shown in FIG. 6. It is assumed that point "P" is a designated position where the correcting process is performed, point "O" a datum point of ruled lines (FIG. 7B), and length "$r_o$" an interval of ruled lines (step 601). A content of counter "i" is equal to 0 (step 602). Distance "r" between two points "O" and "P" ($r=|OP|$) is calculated (step 603). A radius "$r_i$" of a ruled line is obtained at step 604 ($r_i = r_o \times i$). Then, comparison is made between "r" and "$r_i$" to determine a ruled line for correcting the point "P". If $r = r_i$, then since the point "P" is located on the ruled line, this process operation is finished without performing further process operation (step 605). If the distance "r" is greater than the radius "$r_i$" (step 606), then the content of the counter "i" is counted up by 1 (step 607) and the process is returned to step 604. If "r" is smaller than "$r_i$", then decision is made on such a rule line that is positioned closer to the point "P" among the (i-1)th ruled line and the i-th ruled line. In case that the two ruled lines are positioned equidistant from the point "P", the ruled line positioned outside is selected. The point "P" is corrected to a cross point between a straight line passing through the points "O" and "P" and the ruled lines determined in the above-described manner. In other words, at first, comparison is made between "r" and "$r_i - r_o/2$" (step 608). If $r < r_i - r_o/2$, then the point "P" is to be corrected on the ruled line of radius ($r_i - r_o$) (step 609). If $r \geq r_i - r_o/2$, then the radius "r" is to be corrected on the ruled line of radius $r_i$ (step 610). A point "P" is obtained on a cross point between the ruled line to be used for correction and a line segment OP extending to the side of point "P" (step 611). Thus, point P is corrected to be located on point "P'" (step 612).

After the point designated by the operator has been corrected on the ruled line, the ruled lines for the zooming operation are wiped out, the saved data of the original square rules which have been displayed before the zooming operation is instructed are retrieved, and the original ruled lines are displayed again (step 20 of FIG. 1). And then the zooming process operation of the figure is carried out with employment of the coordinates of the corrected point "P" (step 21 of FIG. 7D).

If the sort of the ruled lines is "lattice" (step 53), then the process advances to a process for correcting the designated point on the latticed rules which will be defined later (step 54). If the sort of the ruled lines is not lattice, the process advances to another process for correcting the point relied on rectangular rules which will be defined later (step 35), then correction is executed.

According to the preferred embodiment of the present invention, an operator may easily employ suitable ruled lines for the subjected figures even in the same figure processing operation.

For instance, in a zooming operation, necessities for designating the zooming size are points selectable for a designated position by the operator and points aiding to determine the zooming size by the operator. In latticed rules, there are many points which cannot be used to zoom a circle, and which impede eye-estimation by the operator for estimating the zooming size, whereby it is difficult to designate a correct position. One of the reasons why the zooming operation is performed by the operator with employment of the ruled lines, is to correct the designated position on the ruled lines thereby to obtain the figure with a constant magnification. However, if the relationship between the position and size of the figure to be zoomed and the position and intervals of the ruled lines are inadequate, it is impossible to obtain a figure having an expected size.

In accordance with the preferred embodiment of the present invention, the ruled lines may be changed into those having suitable sorts, positions and sizes for the subjected figures, depending upon nature of the selected processing operation, and the operator can designate correct positions in order to obtain the required results.

Further, although three different sorts of ruled lines as circular rules, latticed rules and rectangular rules have been employed in the above described embodiment, other forms may be employed. For example, in a zooming operation of an ellipse, ruled lines having a shape analogous to the subjected ellipse may be employed. When a figure having an arbitrary shape is zoomed, ruled lines having a shape analogous to a contour thereof may be employed instead of circumscribed rectangle of this figure. Alternatively, when a rotation process is performed, radial-shaped ruled lines having a center at a datum point of rotation may be employed.

Although unit value of the minimum magnification of the zooming operation is fixed and the interval between the ruled lines is determined by utilizing this fixed unit value in the embodiment, the way to display the ruled lines may be modified, taking account of not only the shapes of the subjected figures, but also their sizes, in such a manner that a minimum magnification unit is selected to be 1, for small figures and 1/10 for large figures.

In accordance with the present invention, since the ruled lines suitable for the contents of the processing operations may be automatically displayed, depending upon the contents of the process operations and also the subjected figures, the user can readily designate correct positions for forming figures and correcting figures.

We claim:

1. A figure processing method for drafting drawings using a drafting machine having a display screen for displaying a subjected figure to be drafted with a figure constructing procedure and ruled lines defined by at least one datum point and used for aiding an operator in a drafting operation, comprising the steps of:
   displaying the subjected figure to be drafted on the display screen;
   determining a sort of the ruled lines to be displayed, in accordance with a shape of the subjected figure to be drafted and displayed on the display screen and the figure constructing procedure selected by the operator;
   determining a coordinate of the datum point of the ruled lines on the display screen in accordance with the shape of the subjected figure;
   displaying a configuration of the ruled lines, based on the coordinates of the datum point;
   acquiring coordinates of a point designated by the operator;
   modifying the coordinates of the designated point, for compliance with the ruled lines; and,
   performing the selected figure constructing procedure on the subjected figure, for compliance with the modified coordinates of the designated point.

2. The figure processing method as claimed in claim 1, wherein the ruled lines include a plurality of concentric circular ruled lines whose center is set at one datum point and whose radius has a length in arithmetic progression, respectively.

3. The figure processing method as claimed in claim 2, wherein when the subjected figure is a circular figure and the figure constructing procedure is selected for size modification of the subjected figure, the sort of the ruled lines to be displayed is determined to be concentric circular ruled lines in the step of determining coordinates of the datum point, and the coordinates of the datum point of the concentric circular ruled lines are decided based on the coordinates of the center of the subjected figure, and the concentric circular ruled lines are displayed on the display screen with the coordinates of the datum point as a center point.

4. A figure processing apparatus comprising:
   a display screen for displaying a subjected figure to be drafted and ruled lines for aiding a drafting operation;
   determining means for determining sort of the ruled lines to be displayed, depending upon both shape of the subjected figure displayed on the display screen and a figure constructing procedure selected by an operator;
   displaying means for determining coordinates of a datum point of the ruled lines on the display screen in accordance with the shape of the subjected figure and displaying configuration of said ruled lines on the display screen relying on the coordinate of the datum point;
   coordinate reading means for acquiring a coordinate of a point designated by the operator; and
   figure constructing means for modifying the coordinates of the designated point relying on said ruled lines, and for performing the selected figure constructing procedure on the subjected figure relying on the modified coordinate of the designated point.

5. The figure processing apparatus as claimed in claim 4, wherein the ruled lines include a plurality of concentric circular ruled lines whose center is set at one datum point and whose radius has a length in arithmetic progression respectively.

6. The figure processing apparatus as claimed in claim 5, wherein when the subjected figure is a circular figure and the figure constructing procedure is selected for size modification of the subjected figure, the determining means determines the sort of the ruled lines to be displayed as concentric circular ruled lines, and the displaying means decides the coordinates of the datum point of the concentric circular ruled lines comprising the coordinates of the center of the subjected figure, and displays the concentric circular ruled lines on the display screen based on the coordinates of the datum point.

7. The figure processing apparatus as claimed in claim 4, wherein the determining means includes a managing table for ruled lines storing information related to sorts of ruled lines to be displayed with respect to the subjected figure to be processed and the figure constructing procedure, and selects the ruled lines to be displayed with reference to the managing table, the managing table being rewritable with the stored information.

* * * * *